(12) United States Patent
Yang

(10) Patent No.: US 11,716,410 B2
(45) Date of Patent: Aug. 1, 2023

(54) MOBILE TERMINAL, ELECTRONIC DEVICE, AND HOST ASSEMBLY

(71) Applicant: GUANGDONG OPPO MOBILE TELECOMMUNICATIONS CORP., LTD., Guangdong (CN)

(72) Inventor: Zimei Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 7 days.

(21) Appl. No.: 17/192,053

(22) Filed: Mar. 4, 2021

(65) Prior Publication Data

US 2021/0195010 A1  Jun. 24, 2021

Related U.S. Application Data

(63) Continuation of application No. PCT/CN2019/089418, filed on May 31, 2019.

(30) Foreign Application Priority Data

Sep. 6, 2018  (CN) .......................... 201821463195.3

(51) Int. Cl.
*H04M 1/04* (2006.01)
*H04M 1/02* (2006.01)

(52) U.S. Cl.
CPC ........... *H04M 1/04* (2013.01); *H04M 1/0216* (2013.01); *H04M 1/0254* (2013.01); *H04M 2201/08* (2013.01)

(58) Field of Classification Search
CPC .... H04M 1/04; H04M 1/0216; H04M 1/0254; H04M 2201/08; H04M 1/02;
(Continued)

(56) References Cited

U.S. PATENT DOCUMENTS

2010/0075726 A1  3/2010  Han et al.
2013/0335914 A1*  12/2013  Lee ..................... G06F 1/1654
                                                    361/679.41
(Continued)

FOREIGN PATENT DOCUMENTS

CN    1375153 A    10/2002
CN    02710823 A    7/2005
(Continued)

OTHER PUBLICATIONS

Extended European Search Report for EP Application 19856544.2 dated Oct. 1, 2021. (10 pages).
(Continued)

*Primary Examiner* — Lester G Kincaid
*Assistant Examiner* — Maryam Soltanzadeh
(74) *Attorney, Agent, or Firm* — Young Basile Hanlon & MacFarlane, P.C.

(57) ABSTRACT

A mobile terminal, an electronic device, and a host assembly may be disclosed. The mobile terminal may include a host assembly and a display assembly. The host assembly may include a base and a support. The base may include a first surface. The first surface may define a receiving groove. The support can be capable of being located in the receiving groove and unfolded relative to the base. The support may include an inner face. The display assembly may include a display face, a back face and a peripheral side face. When the support is unfolded with a first angle relative to the first surface of the base, the display face or the back face of the display assembly may be attached to the inner face, the peripheral side face of the display assembly may abut against the base at a bottom of the receiving groove.

20 Claims, 9 Drawing Sheets

(58) Field of Classification Search
CPC ........... H04M 1/0256; H04M 2250/16; H04M 2250/18; H04M 1/0214; H04M 1/0235; H04M 1/0241; H04M 2250/22; H02J 7/0044

See application file for complete search history.

(56) References Cited

U.S. PATENT DOCUMENTS

| | | |
|---|---|---|
| 2014/0355196 A1 | 12/2014 | Hashimoto et al. |
| 2016/0246333 A1* | 8/2016 | Mehandjiysky ...... G06F 1/1656 |
| 2016/0349801 A1 | 12/2016 | Liang et al. |
| 2018/0335803 A1* | 11/2018 | Jan ........................ G06F 1/1632 |

FOREIGN PATENT DOCUMENTS

| | | |
|---|---|---|
| CN | 101610596 A | 12/2009 |
| CN | 107454211 A | 12/2017 |
| EP | 2677391 A2 | 12/2013 |
| WO | 2015073014 A1 | 5/2015 |

OTHER PUBLICATIONS

International Search Report with English Translation of International application No. PCT/CN2019/089418 dated Sep. 5, 09.2019 (12 pages).

* cited by examiner

MOBILE TERMINAL, ELECTRONIC DEVICE, AND HOST ASSEMBLY

CROSS-REFERENCE TO RELATED APPLICATION(S)

This application is a continuation of International Application No. PCT/CN2019/089418, filed on May 31, 2019, which claims priorities to Chinese Patent Application No. 201821463195.3, filed on Sep. 6, 2018, the contents of both of which are herein incorporated by reference in their entireties.

TECHNICAL FIELD

The described embodiments relate to mechanical structure communication technology, and in particular to a mobile terminal, an electronic device, and a host assembly.

BACKGROUND

At present, smart phones are increasingly entering people's daily lives. Users can communicate, surf the Internet, take pictures and watch videos through smart phones. While watching videos, most of the users fix their smartphones by holding the smartphones in their hands. Thus, the hands of the users are not able to be freed and the user experience is poor.

SUMMARY

The present disclosure provides a mobile terminal, an electronic device, and a host assembly.

The embodiments of the present disclosure adopt the following technical solutions.

The present disclosure may provide a mobile terminal. The mobile terminal may include a host assembly and a display assembly. The host assembly may include a base and a support. The base may include a first surface. The first surface may define a receiving groove. The support can be rotatably connected to the base. The support can be capable of being located in the receiving groove and unfolded relative to the base. The support may include an inner face. The inner face may face the first surface. The display assembly can be detachably connected to the host assembly. The display assembly may include a display face, a back face and a peripheral side face. The back face may be arranged opposite to the display face. The peripheral side face can be connected between the display face and the back face. When the support is unfolded with a first angle relative to the first surface of the base, the display face or the back face of the display assembly may be attached to the inner face, the peripheral side face of the display assembly may abut against the base at a bottom of the receiving groove.

The present disclosure may provide an electronic device. The electronic device may include an operating mechanism and a display mechanism. The operating mechanism may include a supporting mount and a supporting plate. The supporting plate can be rotatably connected to the supporting mount. When the supporting plate is unfolded with a predetermined angle relative to the supporting mount, the supporting plate can be fixed relative to the supporting mount and cooperatively define a supporting space with the supporting mount. The display mechanism can be capable of communicating with the supporting mechanism. When the display mechanism is disposed in the supporting space, the display mechanism may be cooperatively supported by the supporting plate and the supporting mount.

The present disclosure may provide a host assembly for a mobile terminal. The mobile terminal may include an external device. The external device may be detachably connected to the host assembly. The external device may include a first supported face and a second supported face. The second supported face may be connected to the first supported face. The host assembly may include a seat and a support. The seat may include a bearing face. The bearing face may define a receiving slot. The support may be rotatably connected to the seat. The support may be capable of being located in the receiving slot and unfolded relative to the seat. The support may include an inner face facing the bearing face. When the support is unfolded with a predetermined angle relative to the bearing face, the first supported face of the external device may be attached to the inner face, and the second supported face of the external device may abut against the seat at a bottom of the receiving slot.

BRIEF DESCRIPTION OF DRAWINGS

In order to make the technical solution described in the embodiments of the present disclosure more clear, the drawings used for the description of the embodiments will be briefly described. Apparently, the drawings described below are only for illustration but not for limitation. It should be understood that, one skilled in the art might acquire other drawings based on these drawings, without paying any creative efforts.

DETAILED DESCRIPTION

Figure 1:
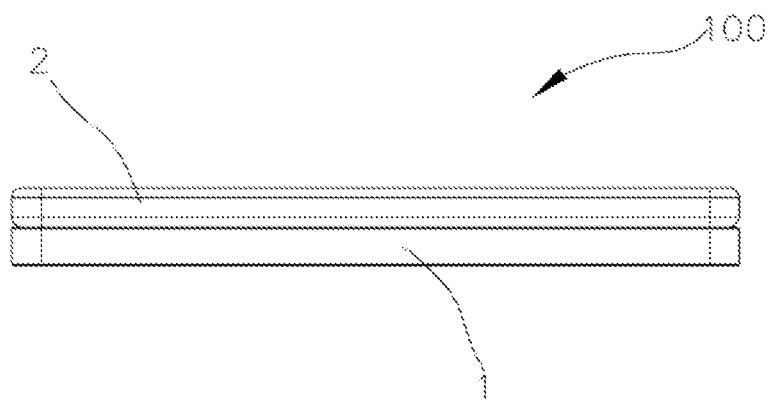
FIG. 1 is a structural view of a mobile terminal according to an embodiment of the present disclosure under a use state.

Technical solutions of the embodiments of the present disclosure may be clearly and comprehensively described by referring to accompanying figures of the embodiments. Obviously, embodiments to be described are only a part of, but not all of, the embodiments of the present disclosure. Any ordinary skilled person in the art may obtain other embodiments based on the embodiments of the present disclosure without any creative work, and the other embodiments should be included in the scope of the present disclosure.

A mobile terminal according to an embodiment of the present disclosure may include a host assembly and a display assembly. The host assembly may include a base and a support. The base may include a first surface. The first surface may define a receiving groove. The support can be rotatably connected to the base. The support can be capable of being located in the receiving groove and unfolded relative to the base. The support may include an inner face. The inner face may face the first surface. The display assembly can be detachably connected to the host assembly. The display assembly may include a display face, a back face and a peripheral side face. The back face may be arranged opposite to the display face. The peripheral side face can be connected between the display face and the back face. When the support is unfolded with a first angle relative to the first surface of the base, the display face or the back face of the display assembly may be attached to the inner face, the peripheral side face of the display assembly may abut against the base at a bottom of the receiving groove.

In another embodiment, the support may include a first outer face. The first outer face may be arranged opposite to the inner face. When the support is located in the receiving groove, the first outer face may be substantially flush with the first surface.

In another embodiment, the base may include a first side face, a second side face and a third side face. The first side face may be adjacent and connected to the first surface. The second side face may be adjacent and connected to the first surface. The second side face may be arranged opposite to the first side face. The third side face may be adjacent and connected to the first surface. The third side face may be connected between the first side face and the second side face. The third side face may be parallel to a rotation center axis of the support.

In further another embodiment, the base may include a fourth side face. The fourth side face may be opposite to the third side face. The fourth side face may be connected between the first side face and the second side face. The receiving groove may include a first end and a second end opposite to the first end. The first end of the receiving groove may penetrate through the third side face. The second end of the receiving groove may penetrate through the fourth side face.

In still further another embodiment, the receiving groove may include a first end and a second end. The second end may be opposite to the first end. The first end of the receiving groove may penetrate through the first side face. The second end of the receiving groove may penetrate through the second side face.

In another embodiment, the base may include a fixing member. The fixing member may be disposed at the bottom of the receiving groove. Two pivoting parts may be arranged on the fixing member. Each of two ends of the fixing member may be provided with a corresponding one of the two pivoting parts. Each of two ends of the support may be rotatably connected to the corresponding one of the two pivoting parts.

In another embodiment, when the support is unfolded relative to the base, the display face or the back face of the display assembly may be attached to the inner face, and the peripheral side face of the display assembly may abut against the fixing member.

In another embodiment, the fixing member may include a second outer face away from the bottom of the receiving groove. When the support is located in the receiving groove, the first outer face of the support may be substantially flush with the second outer face of the fixing member.

In further another embodiment, the fixing member may include a fixing seat and a fixing rod. The fixing seat may be disposed at the bottom of the receiving groove. The fixing seat may define a fixing hole. The fixing rod may be stationary relative to the fixing seat and partially located in the fixing hole. Two ends of the fixing rod may extend out of the fixing hole and operate as the two pivoting parts.

In further another embodiment, the fixing rod may include a first rod, a second rod, and an elastic member. The elastic member may be elastically disposed between the first rod and the second rod. Part of the first rod, part of the second rod and the elastic member may be located in the fixing hole. An end of the first rod and an end of the second rod may extend out of the fixing hole and operate as the two pivoting parts.

In further another embodiment, an outer peripheral face of a part of the fixing rod located in the fixing hole may include at least one plane.

In still further another embodiment, the support may include a supporting plate. An end of the supporting plate may define a recess. Each of two side walls of the fixing plate arranged at two opposite sides of the recess may define a pivoting hole. Each of two pivoting parts may be interposed in a corresponding pivoting hole. Each of two pivoting parts may be rotatably connected to the supporting plate at the corresponding pivoting hole. The host assembly may further include two limiting members. Each of the two limiting members may be disposed between a corresponding pivoting part and an inner wall of the supporting plate around a corresponding pivoting hole. The supporting plate may be unfolded and fixed relative to the base.

In another embodiment, the limiting member may include two limiting protrusions. Each of the two limiting protrusions may be disposed on a corresponding pivoting part. Each of two inner walls of the supporting plate around a corresponding pivoting hole may define a limiting groove. When each of the limiting protrusions on a corresponding pivoting part is located in a corresponding limiting groove of the supporting plate, the support may be unfolded and fixed relative to the base.

In another embodiment, the host assembly may include a keyboard. The keyboard may be disposed on the first surface and adjacent to the receiving groove.

In another embodiment, the base may define at least one accommodating groove at the bottom of the receiving groove. The accommodating groove may be configured to accommodate an external device when the support is unfolded relative to the base.

In further another embodiment, the mobile terminal may further include a first magnetic element and a second magnetic element. The first magnetic element may be disposed on the support. The second magnetic element may be located on the display assembly. The second magnetic may be magnetically attracted to the first magnetic element. When the display assembly is carried on the support, the display assembly may be stably arranged relative to the support under a magnetic force of the second magnetic element and the first magnetic element.

In still further another embodiment, the mobile terminal may further include a first electric connection part and a second electric connection part. The first electric connection part may be arranged on the inner face. A second electric connection part may be disposed on the display assembly. When the display face or the back face of the display assembly is attached to the inner face, the first electric connection part may be contacted and electrically connected with the second electric connection part, and a transmission mode between the display assembly and the host assembly may be a wired data transmission.

In still further another embodiment, the host assembly may include an external communication module and a first internal wireless communication module. The external communication module may be configured to communicate with an external device. A first internal wireless communication module may be configured to communicate with the external communication module. The display assembly may include a second internal wireless communication module. When the second electric connection part is disconnected from the first electric connection part, the second internal wireless communication module may communicate with the first internal wireless communication module, and the transmission mode between the display assembly and the host assembly may be a wireless data transmission.

In still further another embodiment, the host assembly may include a detection element and a changeover switch. In response to the detection element detecting that the second electric connection part is electrically connected to the first electric connection part, the changeover switch may change the transmission mode from the wireless data transmission to the wired data transmission.

In still further another embodiment, the mobile terminal may further include a button. The button may be disposed on the first surface. The button may be configured to establish or discontinue a data transmission between the host assembly and the display assembly.

An electronic device according to an embodiment of the present disclosure may include an operating mechanism and a display mechanism. The operating mechanism may include a supporting mount and a supporting plate. The supporting plate may be rotatably connected to the supporting mount. When the supporting plate is unfolded with a predetermined angle relative to the supporting mount, the supporting plate may be fixed relative to the supporting mount and cooperatively define a supporting space with the supporting mount. The display mechanism can be capable of communicating with the supporting mechanism. When the display mechanism is disposed in the supporting space, the display mechanism may be cooperatively supported by the supporting plate and the supporting mount.

A host assembly according to an embodiment of the present disclosure may be configured for a mobile terminal. The mobile terminal may include an external device. The external device may be detachably connected to the host assembly. The external device may include a first supported face and a second supported face. The second supported face may be connected to the first supported face. The host assembly may include a seat and a support. The seat may include a bearing face. The bearing face may define a receiving slot. The support may be rotatably connected to the seat. The support may be capable of being located in the receiving slot and unfolded relative to the seat. The support may include an inner face facing the bearing face. When the support is unfolded with a predetermined angle relative to the bearing face, the first supported face of the external device may be attached to the inner face, and the second supported face of the external device may abut against the seat at a bottom of the receiving slot.

Embodiments of the present disclosure provide a mobile terminal. The mobile terminal can be any device with a communication function and storage function, such as a tablet computer, a mobile phone, an e-reader, a notebook computer, a vehicle-mounted device, a wearable device, or the like.

Figure 2:
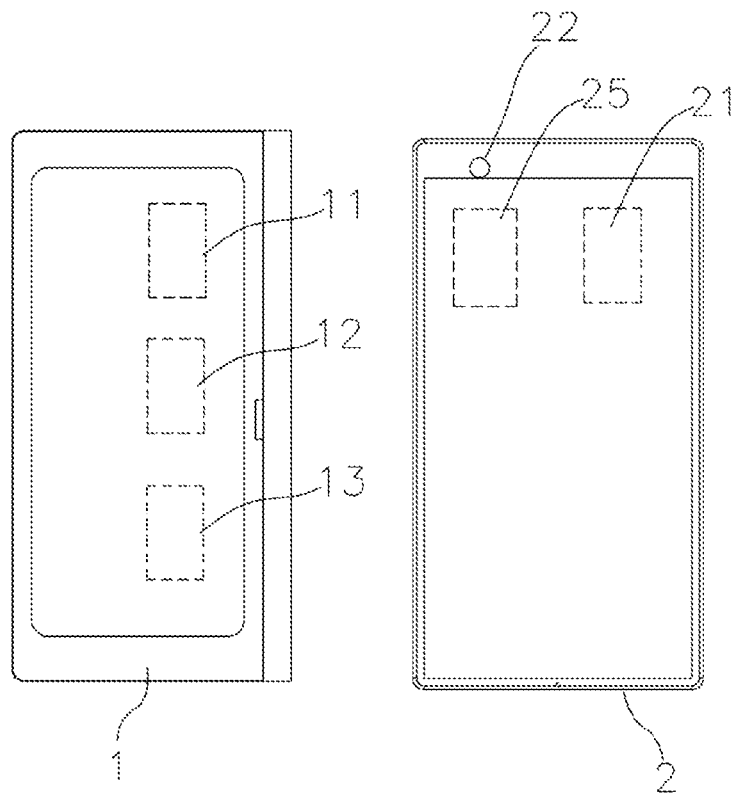
FIG. 2 is a structural view of the mobile terminal in FIG. 1 under another use state.

As shown in FIGS. 1-2, the mobile terminal 100 may include a host assembly 1 and a display assembly 2 detachably connected to the host assembly 1. It can be understood that, the host assembly 1 may include an external communication module 11, a first internal wireless communication module 12, and a charging component 13. The external communication module 11 may be configured to communicate with external devices such as servers, base stations, or the like. The first internal wireless communication module 12 may communicate with the external communication module 11. The display assembly 2 may include a second internal wireless communication module 21, a battery 25, and a camera assembly 22. The external communication module 11 may include, but be not limited to, an antenna component and a Wireless-Fidelity (Wi-Fi) component. The host assembly 1 can perform functions such as calling and surfing the Internet through the external communication module 11. The first internal wireless communication module 12 of the host assembly 1 may be capable of communicating with the second internal wireless communication module 21 of the display assembly 2 to realize a data transmission between the host assembly 1 and the display assembly 2. The first internal wireless communication module 12 can include, but be not limited to, Bluetooth, Wi-Fi and Near Field Communication (NFC). The second internal wireless communication module 21 may correspond to or be in accordance with the first internal wireless communication module 12. Since the host assembly 1 includes the first internal wireless communication module 12, and the display assembly 2 includes the second internal wireless communication module 21, no matter whether the host assembly 1 and the display assembly 2 are in a combined/assembled state or a separated state, a wireless data transmission can be performed between the host assembly 1 and the display assembly 2 according to user's choice.

The charging component 13 of the host assembly 1 can be configured to charge the battery 25 to supply power to the display assembly 2. Thus, when the display assembly 2 needs a power supply, the display assembly 2 can be charged by the host assembly 1 via a wired charging or a wireless charging.

Figure 3:
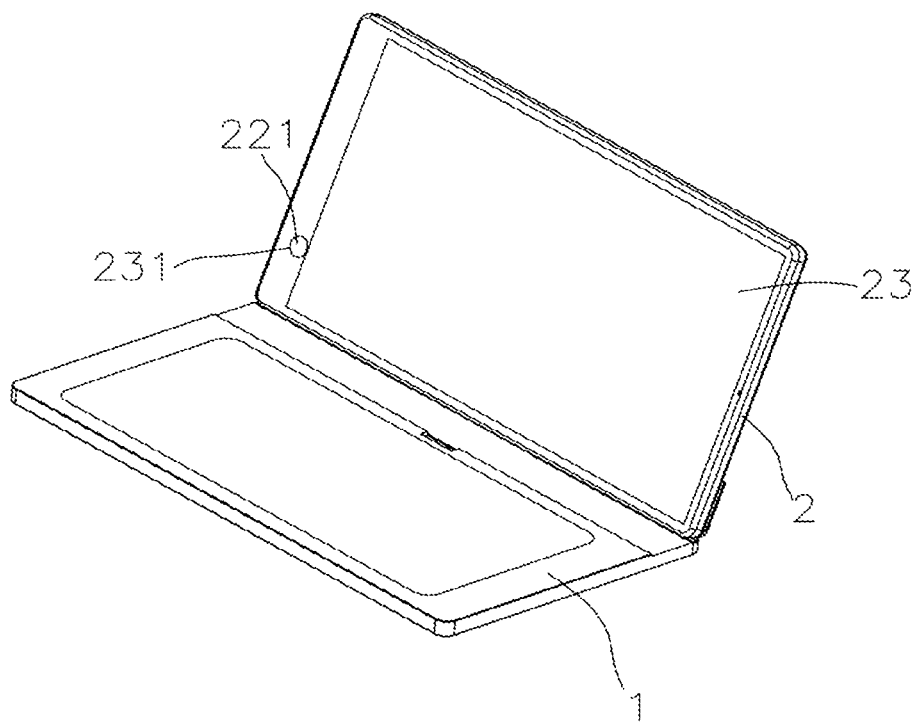
FIG. 3 is a structural view of the mobile terminal in FIG. 1 under another use state.
Figure 4:
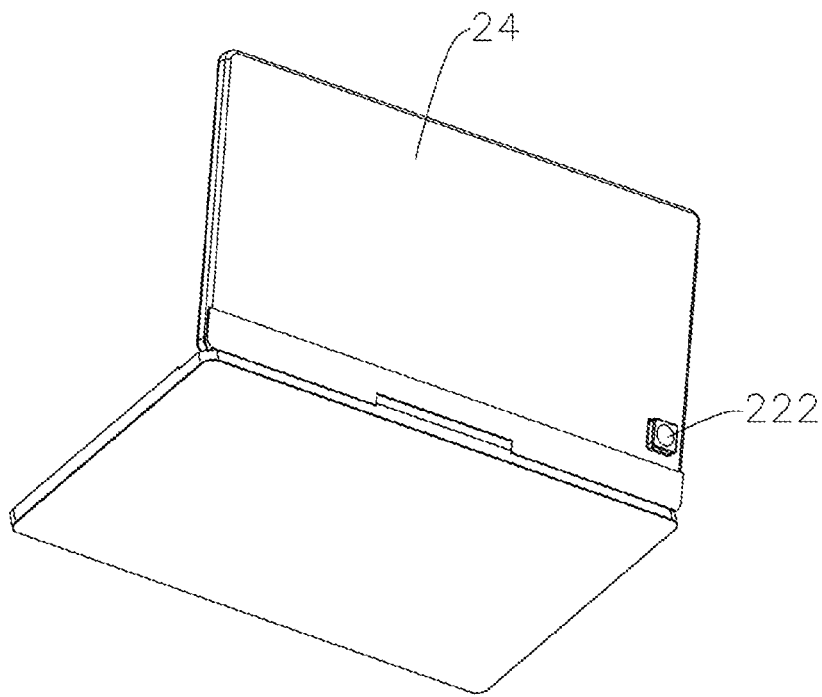
FIG. 4 is a structural view of the mobile terminal in FIG. 3 under another use state from another perspective.

With reference of FIGS. 3 and 4 together, the camera assembly 22 of the display assembly 2 may include a first camera 221 and a second camera 222. A light-receiving direction of the first camera 221 and a light-receiving direction of the second camera 222 may be opposite to each other. The display assembly 2 may have a display face 23 and a back face 24 arranged opposite to each other. The display face 23 can be configured to display images. A light-transmitting hole 231 for the first camera 221 can be defined in the display face 23. The first camera 221 can receive light through the light-transmitting hole 231 to realize a photographing function. The first camera 221 can be a front camera. The second camera 222 may be arranged in the back face 24 to realize a photographing function. That is to say, the second camera 222 can be a rear camera.

The host assembly 1 and the display assembly 2 can be used in combination or separately.

As illustrated in FIG. 1, the display assembly 2 can be stacked on the host assembly 1. In this way, the mobile terminal 100 can be in a stacked and combined/assembled use state. In this state, the mobile terminal 100 can realize functions such as charging and data transmission. For example, the charging assembly 13 can charge the battery 25 of the display assembly 2, and the first internal wireless communication module 12 can communicate with the second internal wireless communication module 21. A display screen of the display assembly 2 can be placed back to or face away from the host assembly 1. In this way, it is convenient for users to watch the display surface 23. The display screen of the display assembly 2 can also be placed toward or adjacent to the host assembly 1 to protect the display screen.

As shown in FIG. 2, the display assembly 2 and the host assembly 1 can be used separately. In other words, the display assembly 2 can be used separately from the host assembly 1 and used alone. The display assembly 2 can perform the display function through the display screen. The display screen may cover as fully as possible one side of the display assembly 2, i.e., the display face 23, or both sides of the display assembly 2, so that the display assembly 2 can realize a full-screen display. Signals can be transmitted between the second internal wireless communication module 21 and the first internal wireless communication module 12 in a wireless transmission manner. For example, the second internal wireless communication module 21 and the first internal wireless communication module 12 can communicate with each other via Bluetooth, in this way, the display assembly 2 can be in communication connection with the host assembly 1 at a certain distance. For example, when the display assembly 2 is separated from the host assembly 1, a call can be made through the display assembly 2.

As illustrated in FIG. 3, the display assembly 2 can be placed on the host assembly 1 in a side-standing manner, and the mobile terminal 100 can be in a side-standing and combined/assembled use state. When the mobile terminal 100 is in the side-standing combined/assembled use state, the charging assembly 13 can charge the battery 25 of the display assembly 2, and a data transmission can be performed between the host assembly 1 and the display assembly 2. When the display assembly 2 is placed on the host assembly 1 in a side-standing manner, the display assembly 2 may have an upright angle relative to the host assembly 1. In this way, the inconvenience in use that the user needs to hold the display assembly 2 by hands or the display assembly 2 needs to be supported by an external tool while watching videos can be solved, thus the user can watch videos more comfortably.

Figure 5:
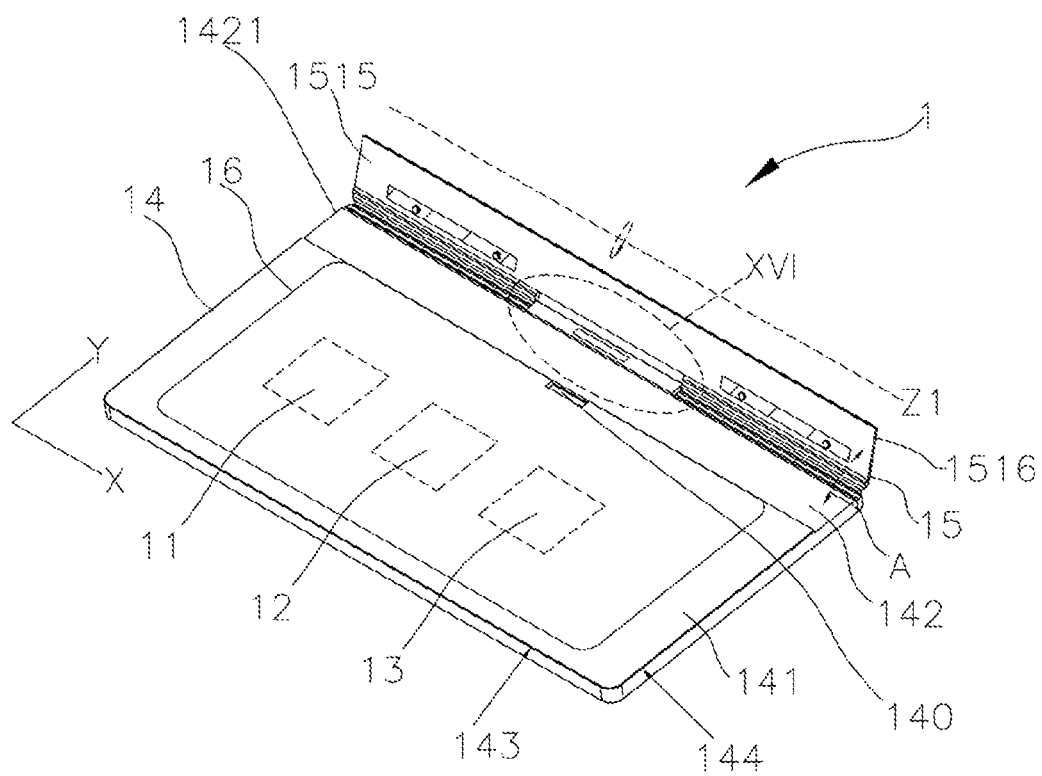
FIG. 5 is a structural view of a host assembly of the mobile terminal in FIG. 1.
Figure 6:
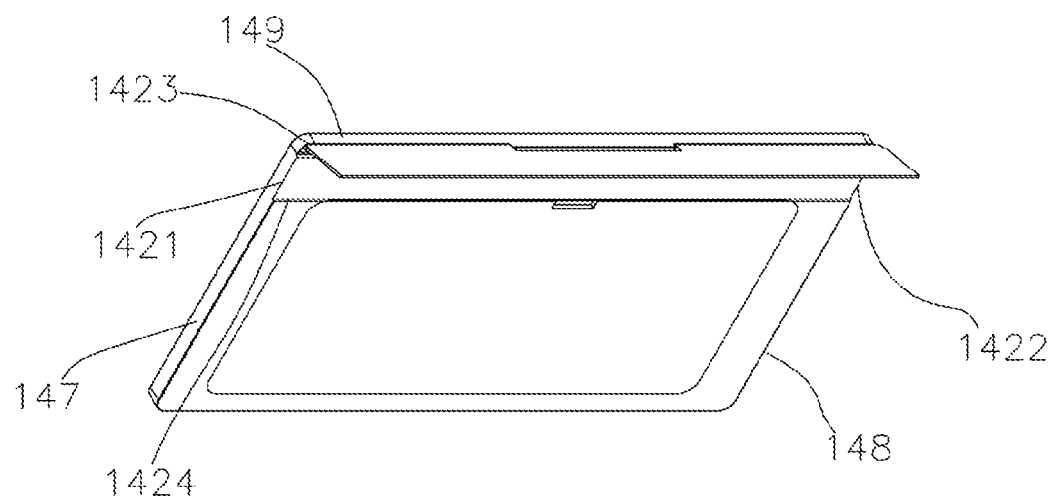
FIG. 6 is a structural view of the host assembly of the mobile terminal in FIG. 1 from another perspective.
Figure 7:
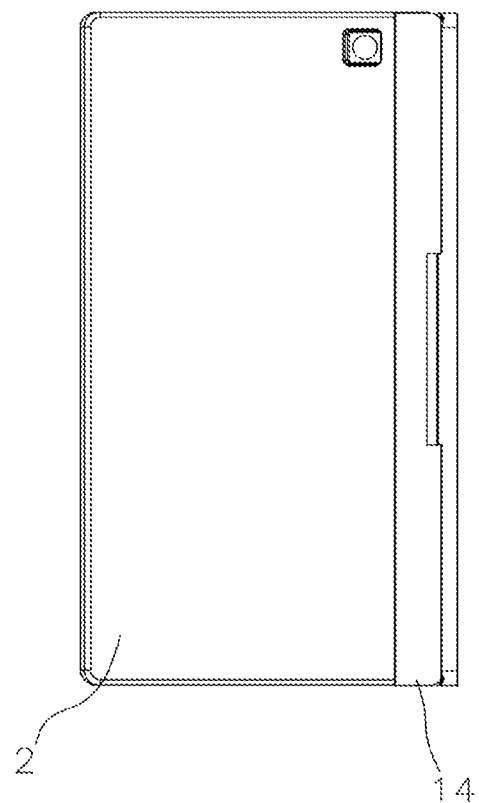
FIG. 7 is a structural view of the host assembly in FIG. 5 with a display assembly received.

As shown in FIGS. 5 to 7, the host assembly 1 may include a base 14 and a support 15. A receiving groove 142 may be defined in a first surface 141 of the base 14. The support 15 may be rotatably connected to the base 14. The support 15 can be received in the receiving groove 142 and unfolded relative to the base 14. The support 15 may have an inner face 1515 facing the first surface 141. The display assembly 2 may further include a peripheral side face 26 connected between the display face 23 and the back face 24. When the support 15 is unfolded with a first angle A relative to the first surface 141 of the base 14, the display face 23 or the back face 24 of the display assembly 2 can be attached to the inner face 1515, and the peripheral side face 26 of the display assembly 2 can abut against the base 14 at a bottom of the receiving groove 142. On one hand, as shown in FIG. 5, the base 14 and the support 15 can be combined together so that the mobile terminal 100 can be in the side-standing and combined/assembled use state. On the other hand, as shown in FIG. 7, the base 14 and the support 15 can be combined or assembled with each other to form a space for accommodating the display assembly 2. In other words, when the display assembly 2 needs to be received, the display assembly 2 can be stacked on the base 14, and then the support 15 can be folded relative to the base 14 until the base 14 abuts against the support 15 such that the mobile terminal 100 is in a receiving and combined/assembled state, thereby providing a protection for the display assembly 2. When the mobile terminal 100 is in the receiving and combined/assembled state, charging and data transmission can also be performed between the host assembly 1 and the display assembly 2.

The host assembly 1 may be in a roughly rectangular shape. The base 14 may be a main body of the host assembly 1. That is, all of the external communication module 11, the first internal wireless communication module 12, and the charging assembly 13 of the host assembly 1 can be arranged on the base 14. It should be noted that the arrangement here can be understood as the aforementioned components can be fixed in the base 14 or partly housed in the base 14 and partly exposed from the base 14 according to corresponding functional requirements. The first surface 141 of the base 14 may also be approximately long rectangle shaped, and include a pair of long side edges 143 disposed oppositely and a pair of short side edges 144 connected between the pair of long side edges 143. Herein, a length of each long side edge 143 is greater than a length of each short side edge 144. For the convenience of description, a length extension direction of each of the pair of long side edge 143 is defined as an X direction, and a length extension direction of the pair of short side edges 144 is defined as a Y direction.

The base 14 may include a first side face 147, a second side face 148, and a third side face 149. All of the first side face 147, the second side face 148, and the third side face 149 can be adjacent and connected to the first surface 141. The first side face 147 and the second side face 148 may be arranged opposite to each other. The third side face 149 can be connected between the first side face 147 and the second side face 148. One of the pair of short side edges 144 may be a side edge of the first surface 141 which is adjacently connected to the first side face 147, and the other of the pair of short side edges 144 may be a side edge of the first surface 141 which is adjacently connected to the second side face 148, and the pair of long side edges 143 can be side edges of the first surface 141 which are adjacently connected to the third side face 149.

Figure 8:
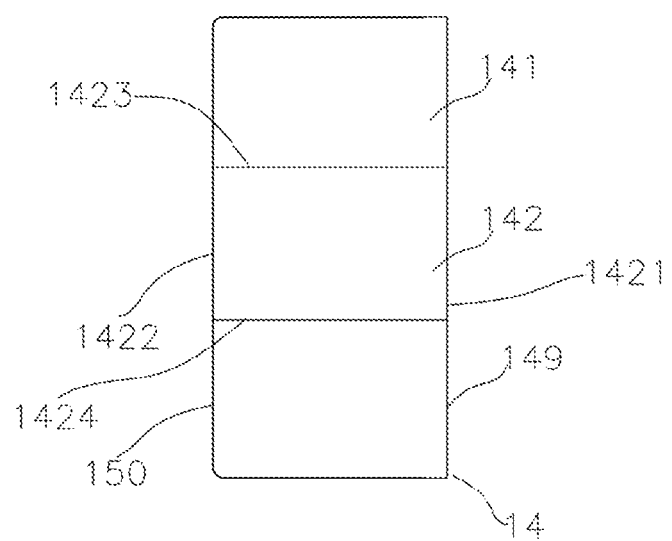
FIG. 8 is a structural view of a receiving groove of the host assembly in FIG. 5 according to another embodiment.

Two opposite ends of the receiving groove 142 may respectively penetrate through the first side face 147 and the second side face 148. In detail, the receiving groove 142 may have a first end 1421 and a second end 1422 disposed opposite to each other, and a third end 1423 and a fourth end 1424 both connected between the first end 1421 and the second end 1422. The third end 1423 and the fourth end 1424 may be arranged opposite to each other. The first end 1421 of the receiving groove 142 can penetrate through the first side face 147, and the second end 1422 of the receiving groove 142 can penetrate through the second side face 148. The third end 1423 can penetrate through the third side face 149. The fourth end 1424 and the first surface 141 adjacent to the fourth end 1424 can corporately form a step. In other words, the fourth end 1424 can be a wall section protruding from the bottom of the receiving groove 142. The receiving groove 142 may be located at an edge of the first surface 141 and can be substantially in a strip shape. The receiving groove 142 may roughly occupy ¼ of the Area of the First Surface 141. In other embodiments, as shown in FIG. 8, the base 14 may include a fourth side face 150 opposite to the third side face 149, the fourth side face 150 can be disposed between and connected to the first side face 147 and the second side face 148. The first end 1421 and the second end 1422 opposite to each other of the receiving groove 142 may penetrate the third side face 149 and the fourth side face 150. The third end 1423 and the fourth end 1424 of the receiving groove 142 may be respectively a wall section protruding from the bottom of the receiving groove 142. In other words, the receiving groove 142 can be located at the middle area of the first surface 141.

As shown in FIG. 5, each of the short side edges 144 can be cut off at a corresponding end of the receiving groove 142 short side edge. A length of the receiving groove 142 may be substantially the same as a length of each of the long side edges 143 of the first surface 141. The structure of the receiving groove 142 may enable the receiving groove 142 to hold a long enough support 15. In addition, since each of two ends of the receiving groove 142 with a shorter length than other ends of the receiving groove 142 can be arranged corresponding to the short side edges 144 of the first surface 141, an area of the first surface 141 occupied by the receiving groove 142 can be small, thus the first surface 141 can have enough space for arranging other components. For example, the host assembly 1 can further include a keyboard 16. The keyboard 16 can be disposed on the first surface 141 and adjacent to the receiving groove 142. In detail, the keyboard 16 may be an inductive keyboard 16 with a small thickness. The keyboard 16 can provide a more convenient input mode for the display assembly 2. A data transmission can be performed between the keyboard 16 and the display assembly 2 through a wireless connection. In other embodiments, other components or structures may be arranged on an area of the first surface 141 except the area occupied by the receiving groove 142. For example, the first surface 141 may also be provided with a display panel for display.

The third side face 149 may be substantially parallel to a rotation central axis Z1 of the support 15. That is to say, a direction of the rotation center axis Z1 of the support 15 may be substantially the same as an extending direction of each of the pair of long side edges 143. Herein, the support 15 may rotate about the rotation center axis Z1 with respect to the base 14. Since the long side edge 143 of the base 14 is long enough, a length of a position at which the support 15 contacts with the base 14 can be substantially equal to the long side edge 143, the support 15 can have a long enough area which can be connected with the base 14. In other embodiments, the direction of the rotation center axis Z1 of the support 15 may also be the same as an extension direction of the short side edge 144.

Figure 9:
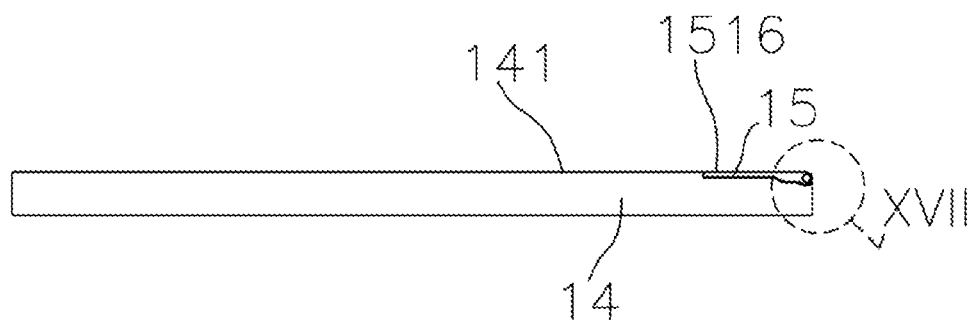
FIG. 9 is a structural view of the host assembly in FIG. 5 in a folded state.
Figure 10:
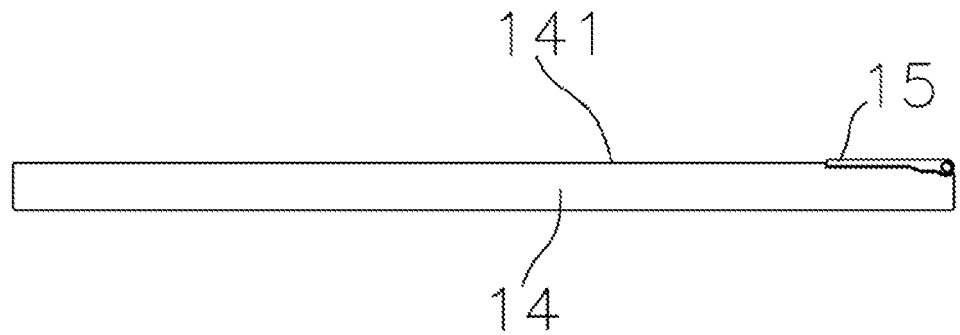
FIG. 10 is a structural view of a support and a base of the host assembly according to another embodiment with a position relationship.
Figure 11:
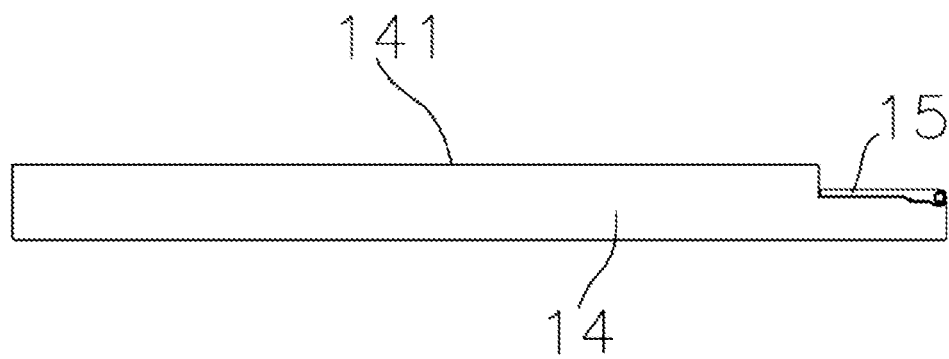
FIG. 11 is a structural view of the support and the base of the host assembly according to another embodiment with another position relationship.

As shown in FIG. 9, when the support 15 is received in the receiving groove 142, a first outer face 1516 of the support 15 away from the bottom of the receiving groove 142 can be substantially flush with the first surface 141. In this way, when the host assembly 1 is in a folded state, the support 15 can be completely accommodated in the base 14, so that each outer face of the host assembly 1 may have a flat outline. In this way, when the display assembly 2 is stacked on the host assembly 1, the display assembly 2 can be placed more stably, thereby reducing the occurrence of unstable drops due to local bumps, and further improving the reliability of the mobile terminal 100. In other embodiments, as shown in FIG. 10, when the host assembly 1 is in the folded state, the support 15 may also protrude out of the base 14; that is, the first outer face 1516 of the support 15 away from the bottom of the receiving groove 142 may be located at a level higher than the first surface 141. Or as shown in FIG. 11, the first surface 141 may also protrude from the face of the support 15 away from the first surface 141; that is, the first outer face 1516 of the support 15 away from the bottom of the receiving groove 142 may be located at a level lower than the first surface 141.

In the present disclosure, a structure of the rotational connection between the support 15 and the base 14 can be specifically as follows.

Figure 12:
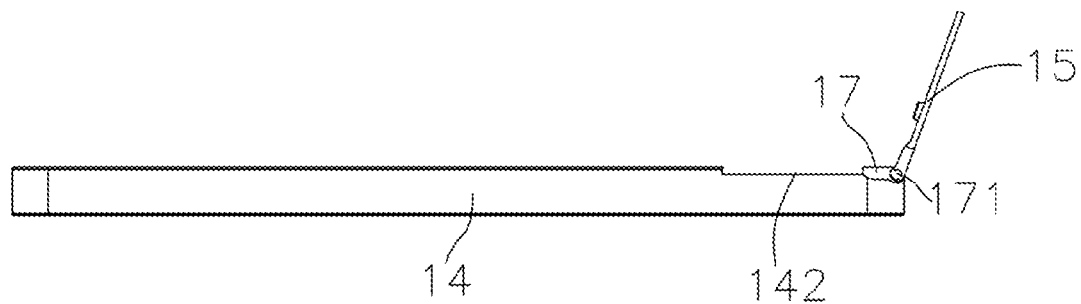
FIG. 12 is a structural view of the host assembly in FIG. 5 from another perspective.

As shown in FIG. 12, the base 14 may further include a fixing member 17. The fixing member 17 may be disposed at the bottom of the receiving groove 142. Each end of the fixing member 17 may be provided with a pivoting part 171. Each end of the support 15 can be rotatably connected to a corresponding pivoting part 171. In other words, the base 14 may be provided with the fixing member 17 that can be rotatably connected to the support 15 so that the support 15 can rotate relative to the base 14.

More specifically, the fixing member 17 can be located at an edge of the receiving groove 142 to reduce the space of the receiving groove 142 occupied by the fixing member 17 to receive the support 15. The pivoting parts 171 on both sides of the fixing member 17 may extend along the X direction. In this way, when the support 15 is rotatably connected to the pivoting parts 171 on both sides of the fixing member 17, the rotation central axis Z1 of the support 15 can extend along the X direction.

Figure 13:
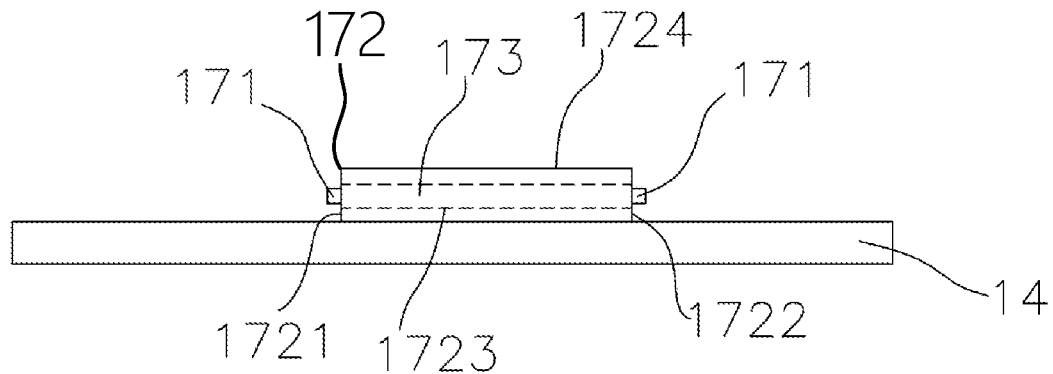
FIG. 13 is a structural view of a fixing member in FIG. 12.
Figure 14:
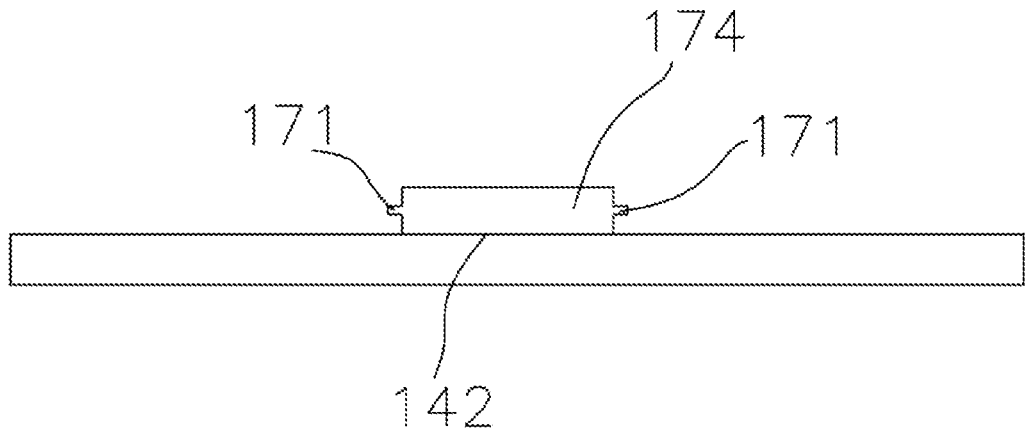
FIG. 14 is a structural view of the fixing member according to another embodiment.

In the present disclosure, as further shown in FIG. 13, the structure of the fixing member 17 is specifically described as follows. The fixing member 17 may include a fixing seat 172 and a fixing rod 173 that may be stationary relative to the fixing seat 172. The fixing seat 172 can be disposed at the bottom of the receiving groove 142 and may define a fixing hole 1723. A part of the fixing rod 173 can be located in the fixing hole 1723, and two ends of the fixing rod 173 may respectively extend out of the fixing hole 1723 to form the two pivoting parts 171. The fixing seat 172 may be substantially elongated, and can extend along the X direction. The fixing seat 172 can be located at the middle of the edge of the receiving groove 142. The fixing seat 172 and the base 14 can be integrally formed. The fixing base 172 may have a first fixing end 1721 and a second fixing end 1722 disposed opposite to each other, and a second outer face 1724 connected between the first fixing end 1721 and the second fixing end 1722. The fixing hole 1723 of the fixing seat 172 may penetrate through the first fixing end 1721 and the second fixing end 1722, so that when the fixing rod 173 is received in the fixing seat 172, it can partially extend out of the fixing seat 172 to form the pivoting parts 171 to be rotatably connected with the support 15. The fixing rod 173 of the fixing member 17 with this structure can be detached from the fixing seat 172. When the fixing rod 173 is damaged, it can be replaced by a new fixing rod 173 to regain the rotating connection between the fixing member 17 and the support 15. In other embodiments, as shown in FIG. 14, the fixing member 17 may also be a bracket 174 detachably connected to a position of the base 14 at the bottom of the receiving groove 142. The bracket 174 may be fixed to the position of the base 14 at the bottom of the receiving groove 142 by means of a screw or a snap. The bracket 174 may be substantially a rectangular block and extend along the X direction. Each end of the bracket 174 along the X direction can be integrally formed with a pivoting part 171 for rotatably connecting with the support 15. Using the fixing member 17 of this structure can reduce the assembly process.

Figure 15:
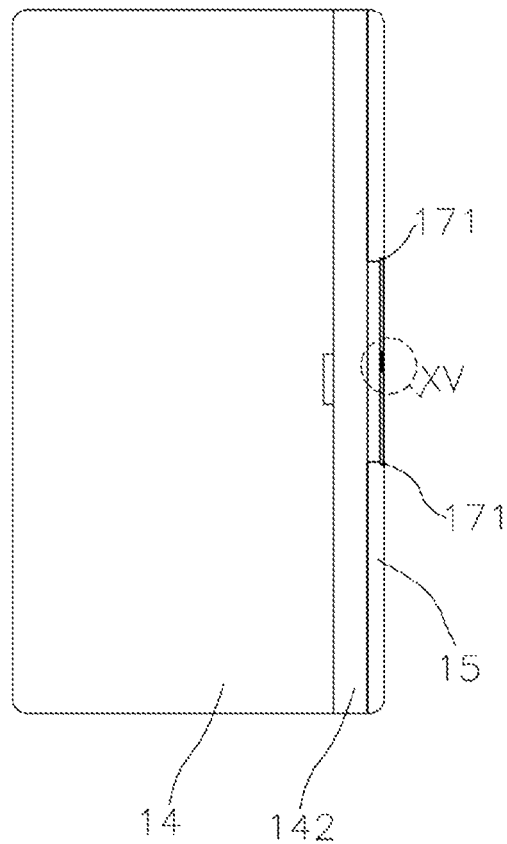
FIG. 15 is a structural view of a fixing rod of the fixing member in FIG. 12.
Figure 16:
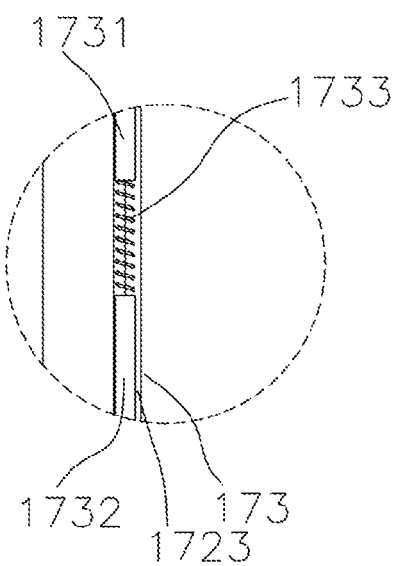
FIG. 16 is a partial view of the XV in FIG. 15.

As illustrated in FIGS. 15 and 16, the fixing rod 173 may include a first rod 1731, a second rod 1732, and an elastic member 1733 elastically arranged between the first rod 1731 and the second rod 1732. Part of the first rod 1731, part of the second rod 1732, and the elastic member 1733 may be located in the fixing hole 1723. An end of the first rod 1731 and an end of the second rod 1732 can respectively extend out of the fixing hole 1723 and can operate as two pivoting parts 171. Specifically, the first rod 1731 and the second rod 1732 may have the same structure, and outer peripheral surfaces of the first rod 1731 and the second rod 1732 can include at least one plane. The outer peripheral surfaces of the first rod 1731 and the second rod 1732 without being rotatably connected with the support 15 may be all square faces. The outer peripheral surfaces rotatably connected with the support 15 are straight cylindrical faces conducive to rotation of the support 15 relative to the fixing seat 172. Correspondingly, the fixing hole 1723 of the fixing seat 172 may also be square. Because of the square configuration, when the first rod 1731 and the second rod 1732 are located in the fixing seat 172, the first rod 1731 and the second rod 1732 may not rotate relative to the fixing seat 172. Thus, when the support 15 is rotatably connected to the ends of the first rod 1731 and the second rod 1732, the first rod 1731 and the second rod 1732 may be preferably fixed in the fixing seat 172 without sliding relative to the fixing seat 172, thereby affecting the sliding of the support 15 relative to the fixed rod 173. In addition, the fixing rod 173 can be composed of two separated rods and an elastic member 1733 arranged between the two separated rods. When the support 15 needs to be fastened to the ends of the first rod 1731 and the second rod 1732, due to the existence of the elastic member 1733, the first rod 1731 and the second rod 1732 can approach each other, thereby reducing the length of the fixing rod 173 in the X direction, which can facilitate the buckle connection between the support 15 and the fixing rod 173. After the support 15 and the fixing rod 173 are buckled together, the elastic member 1733 can provide an elastic force to the first rod 1731 and the second rod 1732 so as to establish a good buckle connection between the support 15 and the fixing rod 173. The elastic member 1733 may be a spring. Correspondingly, ends of the first rod 1731 and the second rod 1732 can extend into two ends of the spring, or can abut against and be bonded to the two ends of the spring. In other embodiments, the fixing rod 173 can also be a whole rod. Two ends of the rod may respectively extend out of the fixing hole 1723 and be located outside the fixing seat 172. The fixing rod 173 may be integrally formed of metal material and plastic material. In the process of buckling with the support 15, due to the presence of plastic material, the fixing rod 173 can be elastically deformed to be buckled with the support 15.

When the support 15 is unfolded relative to the base 14, the display face 23 or the back face 24 of the display assembly 2 can be attached to the support 15, and the peripheral side face 26 of the display assembly 2 can abut against the second outer face 1724 of the fixing base 172.

As shown in FIGS. 5, 13, 17 and 18 together, the support 15 can be rotatably connected to the fixing member 17. The support 15 may be a supporting plate 151. The host assembly 1 may further include two limiting members 152. A recess 1511 may be defined at an end of the supporting plate 151. Each of two side walls 1512 and 1513 of the fixing plate 151 arranged at two opposite sides of the recess 1511 may define a pivoting hole 1514. Each of the two pivoting parts 171 may be interposed in a corresponding pivoting hole 1514 so as to be rotatably connected to the supporting plate 151 at the corresponding pivoting hole 1514. Each of the two limiting members 152 can be disposed between a corresponding pivoting part 171 and an inner wall of the supporting plate 151 around a corresponding pivoting hole 1514, so that when the supporting plate 151 is rotated relative to the base 14 until the angle therebetween is a first angle A, the supporting plate 151 can be relatively fixed relative to the base 14. In other words, the supporting plate 151 can be unfolded relative to the base 14 and relatively fixed. The supporting plate 151 may be configured to be rotatably connected with the fixing member 17, and the limiting member 152 can be arranged between the supporting plate 151 and the fixing member 17, so that when the support 15 is unfolded, it may stably disposed and form a first angle A relative to the base 14.

The first angle A can be the angle between the inner face 1515 of the supporting plate 151 and the first surface 141 of the base 14.

Specifically, the supporting plate 151 may be a thin plate in a shape of elongated rectangular. A size of the supporting plate 151 may coincide with a size of the receiving groove 142, such that when the host assembly 1 is in a folded state, the supporting plate 151 can be completely received in the receiving groove 142. The supporting plate 151 can include the inner face 1515 and the first outer face 1516 oppositely arranged. The inner face 1515 may face toward the first surface 141. In other words, when the host assembly 1 is in a folded state, the inner face 1515 can be attached on the support 15 at the bottom of the receiving groove 142. The first outer face 1516 may be arranged substantially flush with the first surface 141 and the second surface 1724 of the fixing seat 172, such that the surface of the whole device is continuous when the host assembly 1 is in a folded state.

The limiting member 152 may include two limiting protrusions 1521. Each of the two limiting protrusions 1521 may be disposed on a corresponding pivoting part 171. Each of two inner walls of the supporting plate 151 around a corresponding pivoting hole 1514 may define a limiting groove 1522. When a limiting protrusion 1521 on a corresponding pivoting part 171 is disposed in a corresponding limiting groove 1522 defined in the supporting plate 151, the support 15 can be unfolded with the first angle A relative to the base 14. Each limiting protrusion 1521 may be an arc-shaped protrusion. Each limiting groove 1522 may be an arc-shaped groove corresponding to the limiting protrusion 1521. When the supporting plate 151 rotates relative to the pivoting part 171 until the limiting protrusion 1521 is located in the limiting groove 1522, since the supporting plate 151 is in a lock joint with or engaged with the pivoting part 171, the supporting plate 151 can be stably disposed relative to the base 14. In other embodiments, the limiting member 152 can also include a screw, and a limiting hole may penetrate through the supporting plate 151. In this case, the limiting hole can be fluidly connected with the pivoting hole 1514, the screw can be disposed in the limiting hole and abut against the pivoting part 171 in the pivoting hole 1514, in this way, the supporting plate 151 can be arranged stably relative to the base 14.

As illustrated in FIG. 1, when the mobile terminal 100 is in the stacked and combined/assembled use state, the supporting plate 151 can be received in the receiving groove 142, and the display assembly 2 can be disposed on the base 14. Since the supporting plate 151 is substantially flush with the first surface 141 of the base 14 and the surface of the fixing seat 172, the display assembly 2 can be placed on the base 14 stably.

Figure 17:
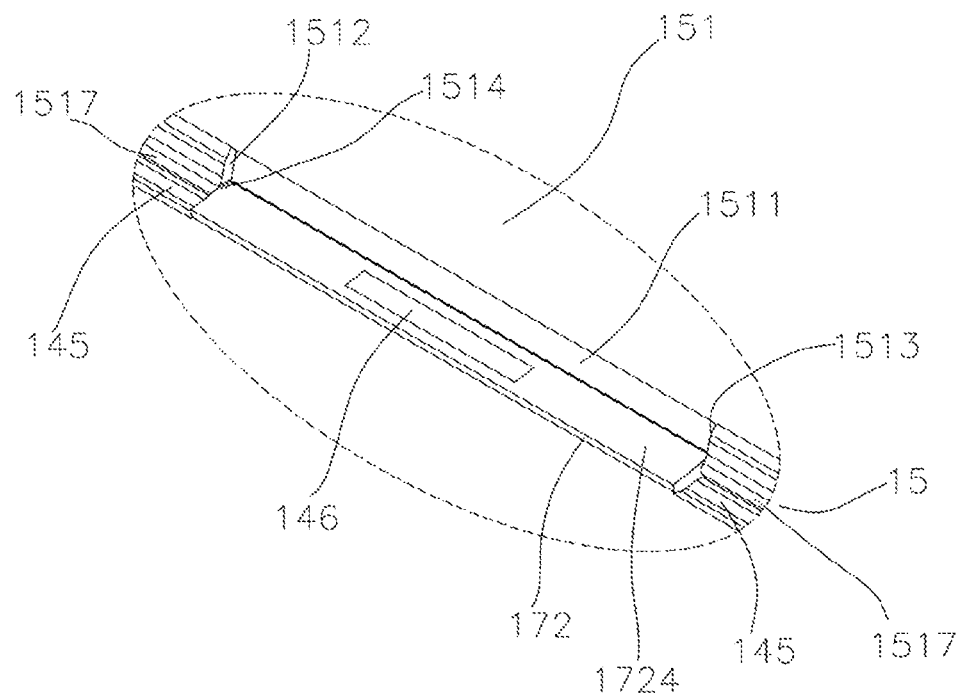
FIG. 17 is a partial view of the XVI in FIG. 5.
Figure 18:
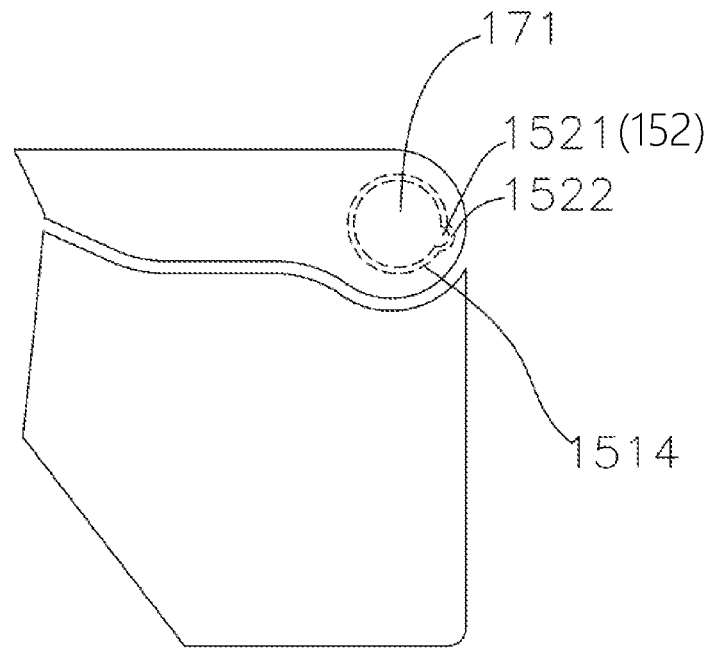
FIG. 18 is a partial view of the XVII in FIG. 9.

As shown in FIGS. 2 and 17, when the mobile terminal 100 is in the side-standing and combined/assembled use state, the supporting plate 151 can be steadily arranged with the first angle A relative to the base 14 under the limitation of the limiting protrusions 1521 and the limiting groove 1522. The display assembly 2 can be carried on the inner face 1515 of the supporting plate 151 and abut against the surface of the fixing seat 172. In this way, while being used, the display assembly 2 can be supported on the support 15, thereby freeing user's hands. It can be understood that, a wireless coil 146 can be engaged in the fixing seat 172. In this way, when the display assembly 2 abuts on the surface of the fixing seat 172, the host assembly 1 can charge the display assembly 2 through the wireless coil 146.

As shown in FIG. 7, when the display assembly 2 of the mobile terminal 100 needs to be accommodated, the display assembly 2 can be stacked on the base 14, and the supporting plate 151 can be unfolded to abut against the display assembly 2, such that the display assembly 2 can be further protected.

As shown in FIG. 5, a buckle portion 140 may be disposed on the first surface 141 near the receiving groove 142. When the host assembly 1 is in a folded state, the supporting plate 151 can be unfolded relative to the base 14 by buckling the buckle portion 140. In some embodiments, the buckle portion 140 may be a recess recessed from the first surface 141 in a direction away from the first surface 141.

The mobile terminal 100 provided in the embodiments of the present disclosure may include two parts which are the host assembly 1 and display assembly 2. The two parts can be used separately or in combination. While used in combination, since the support 15 of the host assembly 1 can be unfolded relative to the first surface 141 of the base 14 in the first angle A, the display assembly 2 can be supported on the support 15 while being used, thereby freeing user's hands. While being used separately, since the base 14 defines the receiving groove 142, the support 15 can be folded relative to the base 14 to be received in the receiving groove 142 of the base 14, thereby facilitating the accommodation of the host assembly 1.

As further shown in FIG. 17, the base 14 may define an accommodating groove 145 at the bottom of the receiving groove 142 of the base 14. When the support 15 is unfolded with the first angle A relative to the base 14, the accommodating groove 145 can be configured to accommodate the external devices, and the support 15 can be used to support the external devices. Specifically, the accommodating groove 145 may extend along the X direction. The number of the accommodating groove 145 is two. The two accommodating grooves 145 can be disposed at two opposite sides of the fixing seat 172 respectively. The two accommodating grooves 145 can be used to accommodating the external devices such as smart phones. It can be understood that, the two accommodating grooves 145 can also be configured to accommodate the display assembly 2.

It can be understood that, two strip-shaped protrusions 1517 can be arranged on and protrude from the supporting plate 151. When the supporting plate 151 are received in the receiving groove 142, each of the two strip-shaped protrusions 1517 can be can be accommodated in a corresponding accommodating groove 145. The shape of the strip-shaped protrusion 1517 can be matched with the corresponding accommodating groove 145, such that when the strip-shaped protrusion 1517 is positioned in the accommodating groove 145, the accommodating groove 145 can be filled up with the corresponding strip-shaped protrusion 1517. The strip-shaped protrusions 1517 with this configuration can reduce dust entry when the strip-shaped protrusions 1517 are accommodated in the accommodating grooves. In addition, the strip-shaped protrusion 1517 can be clamped with or engaged with the accommodating groove 145 to further improve the reliability of the host assembly 1. In other embodiments, a gap may be defined between the strip-shaped protrusions 1517 and the accommodating grooves 145 while the strip-shaped protrusions 1517 are accommodated in the accommodating grooves 145.

Figure 19:
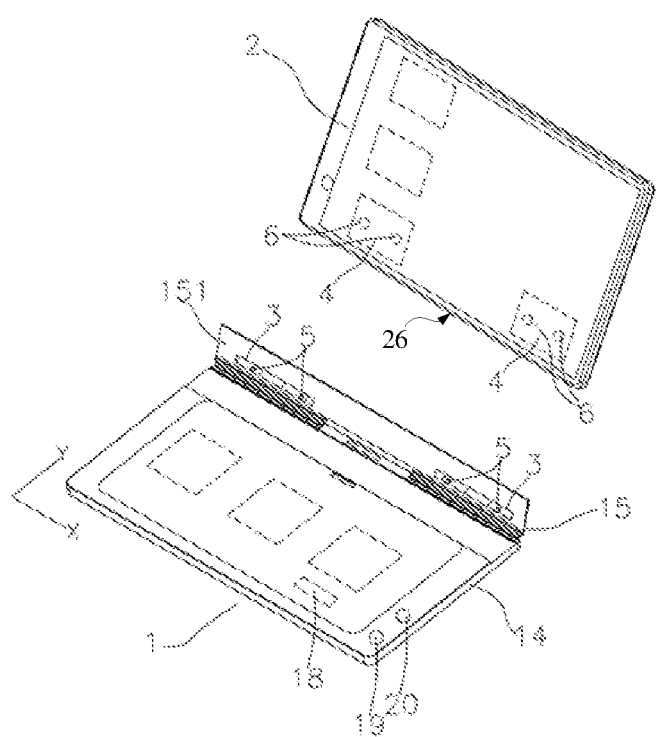
FIG. 19 is a structural view of the host assembly and the display assembly in a divided form.

Moreover, as further shown in FIG. 19, the mobile terminal 100 may further include a first magnetic element 3 and a second magnetic element 4 magnetically attracted each other. The first magnetic element may be disposed on the support 15. The second magnetic element 4 may be positioned on the display assembly 2. When the back face 24 of the display assembly 2 is attached to the inner face 1515 of the support 15, under the magnetic force of the second magnetic element 4 and the first magnetic element 3, the display assembly 2 can be fixed relative to the support 15. Specifically, the first magnetic element 3 may be disposed on the supporting plate 151, and the second magnetic element 4 can be located on the back face 24 of the display assembly 2. When the mobile terminal 100 is in the side-standing and combined/assembled use state, the display assembly 2 may be fixed to the supporting plate 151 more stably via the magnetic force between the first magnetic element 3 and the second magnetic element 4. In this way, the probabilities in dropping of the display assembly 2 can be reduced, and the reliability of the mobile terminal 100 can be improved. In addition, since the first magnetic element 3 is disposed on the supporting plate 151, when the mobile terminal 100 is in the stacked and combined/assembled use state, a magnetic force still exist between the supporting plate 151 and the display assembly 2 to attract each other. The first magnetic element 3 and the magnetic element 4 may be electromagnets, and the magnetic polarities of thereof can be changed by controlling electrical signals. Of course, in other embodiments, the first magnetic element 3 and the second magnetic element 4 can also be magnets.

Furthermore, as shown in FIG. 19, the mobile terminal can include a first electric connection part 5 arranged on the inner face 1515 and a second electric connection part 6 disposed on the display assembly 2. When the display face 23 of the display assembly 2 is attached to the inner face 1515, the second electric connection part 6 may contact and be electrically connected with the first electric connection part 5. In this way, the wired data transmission between the display assembly 2 and the host assembly 1 can be realized. Understandably, when the second electric connection part 6 is in a point contact with the first electric connection part 5, the host assembly 1 can supply power to the display assembly 2. In detail, the first electric connection part 5 and the second electric connection part 6 can be electric pins. The first electric connection part 5 and the first magnetic element 3 can be located in a same area. In this way, when the display assembly 2 and the supporting plate 151 are connected to each other by the magnetic attraction, the first electric connection part 5 can be in a pin to pin connection to the second electric connection part 6, so as to realize the wired data transmission between the display assembly 2 and the host assembly 1. In other words, in addition to the wireless data transmission, the display assembly 2 and the host assembly 1 of the mobile terminal 100 can also communicate with each other through the wired data transmission. The transmission mode of the wired data transmission is electrical transmission, so the transmission speed can be faster than that of the wireless data transmission. However, the wireless data transmission is not restricted by the wiring. Thus, when the host assembly 1 and the display assembly 2 are used separately, according to the needs of users, the host assembly 1 and the display assembly 2 can be communicated with each other via the second internal wireless communication module 21 and the first internal wireless communication module 12 to realize the wireless data transmission between the display assembly 2 and the host assembly 1. In other embodiments, the first electric connection part 5 and the second electric connection part 6 can also be USB interfaces or electric connectors.

As illustrated in FIG. 19, the host assembly can further include a detection element 18 and a changeover switch 19. In response to the detection element 18 detecting that the second electric connection part 6 is electrically connected to the first electric connection part 5, the changeover switch 19 will change the transmission mode from the wireless data transmission to the wired data transmission. Since the wired data transmission has a higher transmission speed, while an electrical connection between the second electric connection part 6 and the first electric connection part 5 is detected by the detection element 18, the wireless data transmission between the host assembly 1 and display assembly 2 can be discontinued and changed to the wired data transmission, thereby further improving the reliability of the mobile terminal 100.

Furthermore, as shown in FIG. 19, the mobile terminal 100 may further include a button 20 disposed on the first surface 141. The button 20 may be configured to establish or discontinue the data transmission between the host assembly 1 and the display assembly 2. The button 20 can be a touch virtual button 20 based on the principle of pressure sensing. The button 20 can be configured to control whether to perform a data transmission between the host assembly 1 and the display assembly 2 or not. The virtual button 20 can have a fool-proofing function. In this way, while the virtual button 20 is no more needed by the user, the virtual button 20 can be controlled to be in a non-use state via a switch function or a way of software setting.

When the mobile terminal 100 provided in the present disclosure is used, the host assembly 1 and the display assembly 2 can be used in combination, and the specific method of combining use can be as follows.

As shown in FIG. 1, when the mobile terminal 100 is in the stacked and combined/assembled use state, the supporting plate 151 can be folded to be received in the receiving groove 142, and the display assembly 2 can be placed on the base 14. Due to the existence of the first magnetic element 3 and the magnetic element 4, the display assembly 2 can be fixed on the first outer face 1516 of the supporting plate 151. When a communication is needed to be established between the host assembly 1 and the display assembly 2, the communication can be carried out by the wireless data transmission.

As shown in FIGS. 3 and 5, when the mobile terminal 100 is in a side-standing and combined/assembled use state, the supporting plate 151 can be fixed with the first angle A relative to the base 4 under the limitation of the limiting protrusions 1521 and the limiting groove 1522, and the display face 23 of the display assembly 2 can be attached to the inner face 1515 of the supporting plate 151 and abut against the second outer face 1724 of the supporting seat 172. In this way, the display assembly 2 can be attached to the supporting plate 151 while being used, and user's hands can be freed. When a communication is needed to be established between the host assembly 1 and the display assembly 2, the communication can be carried out via the wired data transmission. Meanwhile, the charging between the host assembly 1 and the display assembly 2 can also be carried out through the wireless coil 146 or the first electric connection part 5 and the second electric connection part 6.

As shown in FIG. 7, when the display assembly 2 of the mobile terminal 100 needs to be received, the display assembly 2 can be stacked on the base 14, such that the supporting plate 151 can be folded to abut against the display assembly 2 so as to provide a protection to the display assembly 2. When a communication is needed between the host assembly 1 and the display assembly 2, the communication can be established via the wireless data transmission. Charging between the host assembly 1 and the display assembly 2 can be realized through the first electric connection part 5 and the second electric connection part 6.

As shown in FIG. 2, the display assembly 2 and the host assembly 1 can be used separately. The display assembly 2 can be detached from the host assembly 1 and used alone. The display assembly 2 can display images via the display screen. When the host assembly 1 and the display assembly 2 need to communicate with each other, the communication can be established via the wired data transmission.

The mobile terminal 100 provided in the embodiments of the present disclosure may include two parts which are the host assembly 1 and display assembly 2. The two parts can be used separately or in combination. When the two parts are used in combination, since the support 15 of the host assembly 1 can be unfolded relative to the base 14 with the first angle A, the display assembly 2 can be supported by the support 15 while being used, thereby freeing user's hands. When the two parts are used separately, since the base 14 defines the receiving groove 142, the support 15 can be folded relative to the base 14 to be received in the receiving groove 142 of the base 14, thereby facilitating the storage of the host assembly 1.

FIGS. 2-4 illustrate an electronic device. The electronic device according to an embodiment of the present disclosure may include an operating mechanism 1 and a display mechanism 2. The operating mechanism 1 may include a supporting mount 14 and a supporting plate 15. The supporting plate 15 can be rotatably connected to the supporting mount 14. When the supporting plate 15 is unfolded with a predetermined angle relative to the supporting mount 14, the supporting plate 15 can be fixed relative to the supporting mount 14 and cooperatively define a supporting space with the supporting mount 14. The display mechanism 2 can be capable of communicating with the operating mechanism 1. When the display mechanism 2 is disposed in the supporting space, the display mechanism 2 may be cooperatively supported by the supporting plate 15 and the supporting mount 14.

FIGS. 2-4 illustrate a mobile terminal. The host assembly 1 according to an embodiment of the present disclosure may be configured for the mobile terminal. The mobile terminal may include an external device 2. The external device 2 may be detachably connected to the host assembly 1. The external device 2 may include a first supported face 23/24 and a second supported face. The second supported face may be connected to the first supported face 23/24. The host assembly 1 may include a seat 14 and a support 15. The seat 14 may include a bearing face 141. The bearing face 141 may define a receiving slot 142. The support 15 may be rotatably connected to the seat 14. The support 15 can be capable of being located in the receiving slot 142 and unfolded relative to the seat 14. The support 15 may include an inner face 1515 facing the bearing face 141. When the support 15 is unfolded with a predetermined angle relative to the bearing face 141, the first supported face 23/24 of the external device 2 may be attached to the inner face 1515, and the second supported face 26 of the external device 2 may abut against the seat 14 at a bottom of the receiving slot 142.

The embodiments of the present disclosure have been described in detail above, and the principles and implementations of the present disclosure are described in the specific examples. The description of the above implementations is only used to help understand the method and core spirit of the present disclosure. In the meantime, one with ordinary skills in the art may obtain modifications on the specific embodiments and the application range according to the spirit of the present disclosure. In a word, the description shall not be considered as a limit to the present disclosure.

What is claimed is:

1. A mobile terminal, comprising:
   a host assembly having a folded state, comprising:
   a base, comprising a first surface, wherein the first surface defines a receiving groove; and
   a support, rotatably connected to the base, capable of being located in the receiving groove and unfolded relative to the base, and comprising an inner face facing the first surface and a first outer face arranged opposite to the inner face; and
   a display assembly, detachably connected to the host assembly and comprising:
   a display face;
   a back face, arranged opposite to the display face; and
   a peripheral side face, connected between the display face and the back face,
   wherein when the support is unfolded with a first angle relative to the first surface of the base, the display face or the back face of the display assembly is attached to the inner face, and the peripheral side face of the display assembly abuts against the base at a bottom of the receiving groove, and
   wherein when the host assembly is in the folded state, the support is received in the receiving groove, and the first outer face is substantially flush with the first surface.

2. The mobile terminal as claimed in claim 1, wherein the host assembly is in the folded state, the inner face is attached on the base at the bottom of the receiving groove.

3. The mobile terminal as claimed in claim 1, wherein the base comprises:
   a first side face, adjacent and connected to the first surface;
   a second side face, adjacent and connected to the first surface and arranged opposite to the first side face; and
   a third side face, adjacent and connected to the first surface, connected between the first side face and the second side face, and parallel to a rotation center axis of the support.

4. The mobile terminal as claimed in claim 3, wherein the base comprises a fourth side face opposite to the third side face, the fourth side face is connected between the first side face and the second side face, the receiving groove comprises a first end and a second end opposite to the first end, the first end of the receiving groove penetrates through the third side face, and the second end of the receiving groove penetrates through the fourth side face.

5. The mobile terminal as claimed in claim 3, wherein the receiving groove comprises a first end and a second end opposite to the first end, the first end of the receiving groove penetrates through the first side face, and the second end of the receiving groove penetrates through the second side face.

6. The mobile terminal as claimed in claim 1, wherein the base comprises a fixing member, the fixing member is disposed at the bottom of the receiving groove, two pivoting parts are arranged on the fixing member, each of two ends of the fixing member is provided with a corresponding one of the two pivoting parts, and each of two ends of the support is rotatably connected to the corresponding one of the two pivoting parts.

7. The mobile terminal as claimed in claim 6, wherein when the support is unfolded relative to the base, the display face or the back face of the display assembly is attached to the inner face, and the peripheral side face of the display assembly abuts against the fixing member.

8. The mobile terminal as claimed in claim 6, wherein the fixing member comprises a second outer face away from the bottom of the receiving groove, when the support is located in the receiving groove, the first outer face of the support is substantially flush with the second outer face of the fixing member.

9. The mobile terminal as claimed in claim 6, wherein the fixing member comprises:
   a fixing seat, disposed at the bottom of the receiving groove and defining a fixing hole; and
   a fixing rod, stationary relative to the fixing seat and partially located in the fixing hole, wherein two ends of the fixing rod extend out of the fixing hole and operate as the two pivoting parts.

10. The mobile terminal as claimed in claim 9, wherein the fixing rod comprises a first rod, a second rod, and an elastic member elastically disposed between the first rod and the second rod,
    wherein part of the first rod, part of the second rod and the elastic member are located in the fixing hole, and an end of the first rod and an end of the second rod extend out of the fixing hole and operate as the two pivoting parts.

11. The mobile terminal as claimed in claim 6, wherein the support comprises a supporting plate, an end of the supporting plate defines a recess, each of two side walls of the fixing plate arranged at two opposite sides of the recess defines a pivoting hole, each of two pivoting parts is interposed in a corresponding pivoting hole and rotatably connected to the supporting plate at the corresponding pivoting hole; and
    the host assembly further comprises two limiting members, each of the two limiting members is disposed between a corresponding pivoting part and an inner wall of the supporting plate around a corresponding pivoting hole, and the supporting plate is unfolded and fixed relative to the base.

12. The mobile terminal as claimed in claim 11, wherein the limiting member comprises two limiting protrusions, each of the two limiting protrusions is disposed on the corresponding pivoting part, and each of two inner walls of the supporting plate around a corresponding pivoting hole defines a limiting groove;
    when each of the limiting protrusions on the corresponding pivoting part is located in a corresponding limiting groove of the supporting plate, and the support is unfolded and fixed relative to the base.

13. The mobile terminal as claimed in claim 1, wherein the host assembly comprises a keyboard, and the keyboard is disposed on the first surface and adjacent to the receiving groove.

14. The mobile terminal as claimed in claim 1, wherein the base defines at least one accommodating groove at the bottom of the receiving groove, and the at least one accommodating groove is configured to accommodate an external device when the support is unfolded relative to the base.

15. The mobile terminal as claimed in claim 1, further comprising:
a first magnetic element, disposed on the support; and
a second magnetic element, located on the display assembly and magnetically attracted to the first magnetic element,
wherein when the display assembly is carried on the support, the display assembly is stably arranged relative to the support under a magnetic force of the second magnetic element and the first magnetic element.

16. The mobile terminal as claimed in claim 1, further comprising:
a first electric connection part, arranged on the inner face; and
a second electric connection part, disposed on the display assembly,
wherein when the display face or the back face of the display assembly is attached to the inner face, the first electric connection part is contacted and electrically connected with the second electric connection part, and a transmission mode between the display assembly and the host assembly is a wired data transmission.

17. The mobile terminal as claimed in claim 16, wherein the host assembly comprises:
an external communication module, configured to communicate with an external device; and
a first internal wireless communication module, configured to communicate with the external communication module;
the display assembly comprises a second internal wireless communication module,
wherein when the second electric connection part is disconnected from the first electric connection part, the second internal wireless communication module communicates with the first internal wireless communication module, and the transmission mode between the display assembly and the host assembly is a wireless data transmission.

18. The mobile terminal as claimed in claim 17, wherein the host assembly comprises a detection element and a changeover switch, in response to the detection element detecting that the second electric connection part is electrically connected to the first electric connection part, the changeover switch changes the transmission mode from the wireless data transmission to the wired data transmission.

19. An electronic device, comprising:
an operating mechanism having a folded state and, comprising:
a supporting mount, comprising a first surface, and the first surface defines a receiving groove; and
a supporting plate, rotatably connected to the supporting mount and comprising an inner face facing the first face and a first outer face opposite to the inner face, wherein when the supporting plate is unfolded with a predetermined angle relative to the supporting mount, the supporting plate is fixed relative to the supporting mount and cooperatively define a supporting space with the supporting mount; and
a display mechanism, capable of communicating with the operating mechanism, wherein when the display mechanism is disposed in the supporting space, the display mechanism is supported by the supporting plate and the supporting mount,
wherein when the operating mechanism is in the folded state, the supporting plate is received in the receiving groove, and the first outer face is flush with the first surface.

20. A host assembly for a mobile terminal, the mobile terminal comprising an external device detachably connected to the host assembly, the external device comprising a first supported face and a second supported face connected to the first supported face;
the host assembly having a folded state, comprising:
a seat, comprising a bearing face, wherein the bearing face defines a receiving slot; and
a support, rotatably connected to the seat, capable of being located in the receiving slot and unfolded relative to the seat, and comprising an inner face facing the bearing face and a first outer face arranged opposite to the inner face,
wherein when the support is unfolded with a predetermined angle relative to the bearing face, the first supported face of the external device is attached to the inner face, and the second supported face of the external device abuts against the seat at a bottom of the receiving slot, and
wherein when the host assembly is in the folded state, the support is received in the receiving slot and the first outer face is substantially flush with the bearing face.

* * * * *